Figure 2:
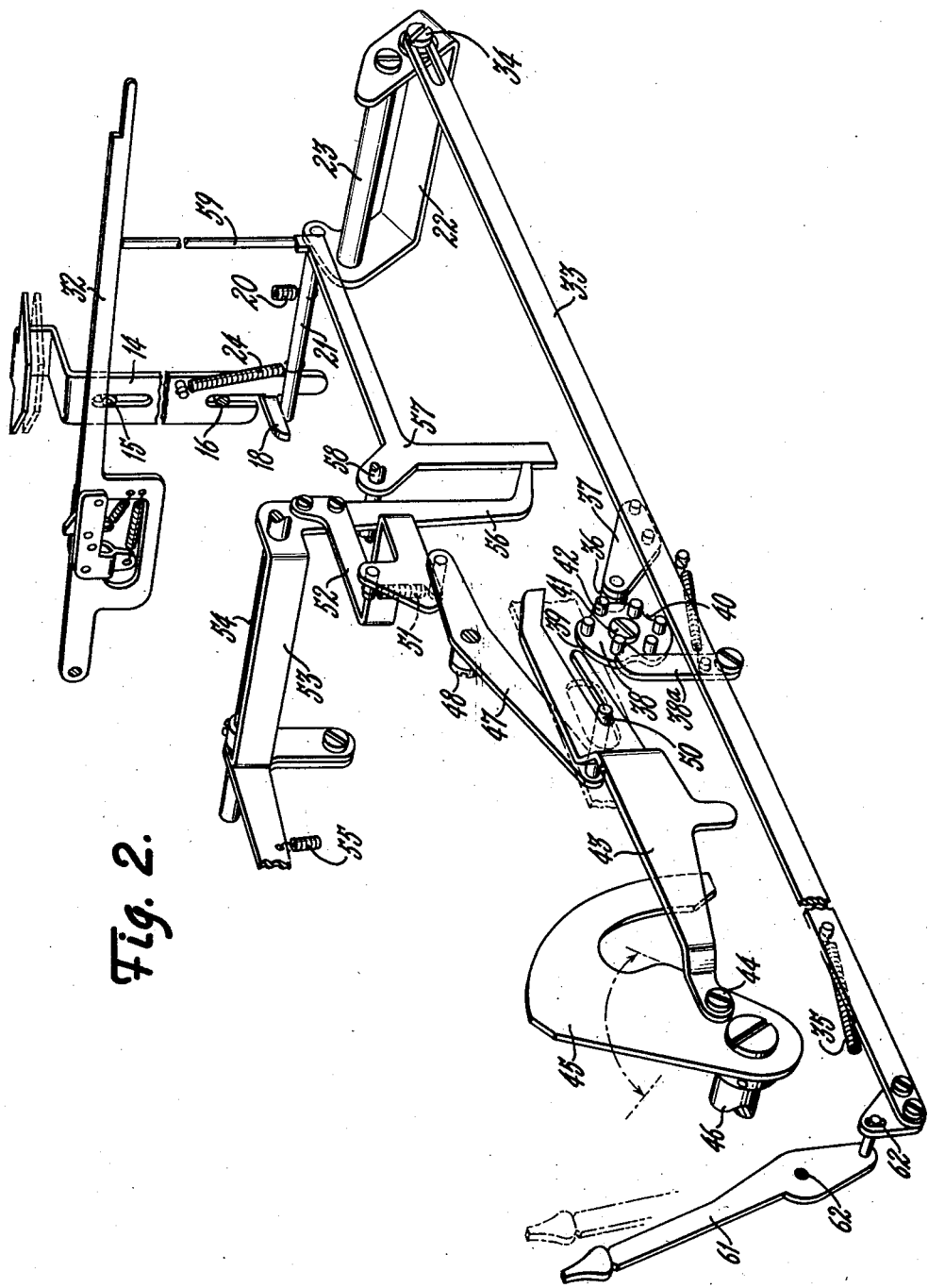

Aug. 14, 1945.  W. A. ANDERSON  2,382,195
CARRIAGE CONTROL FOR ACCOUNTING MACHINES
Filed May 4, 1944  2 Sheets-Sheet 1
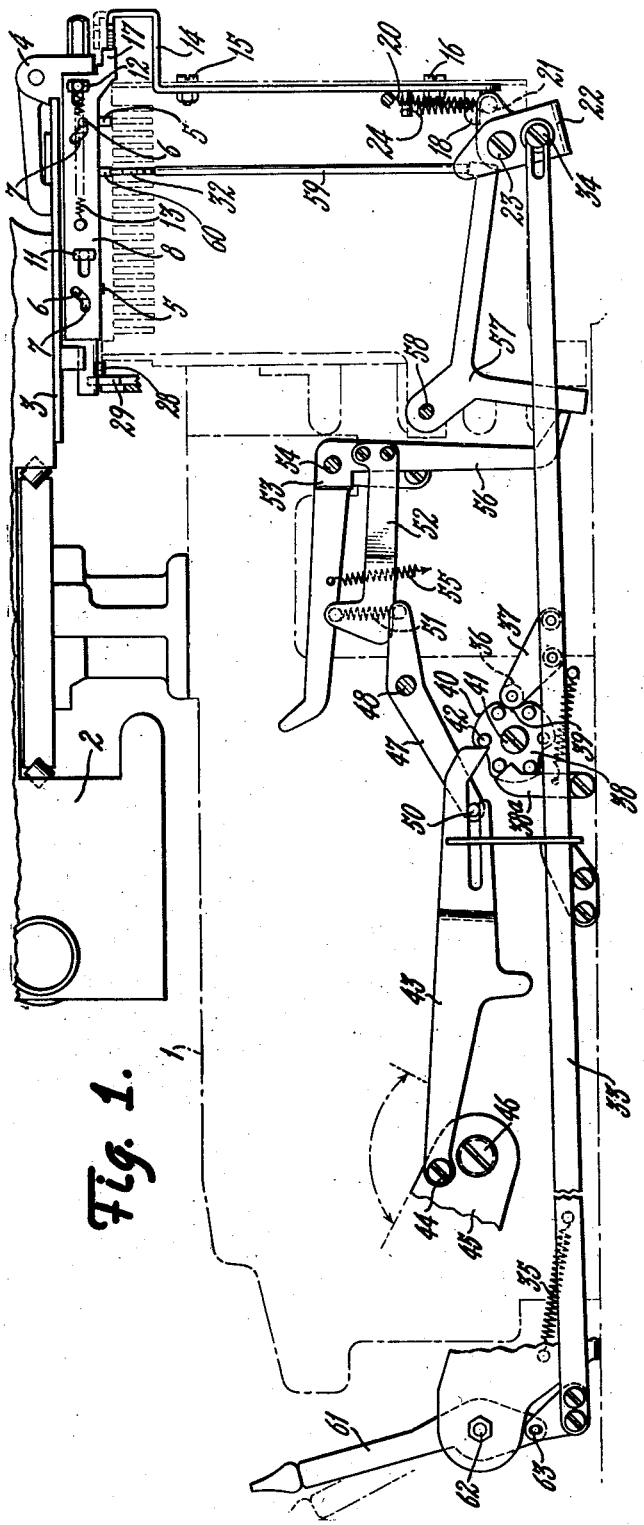
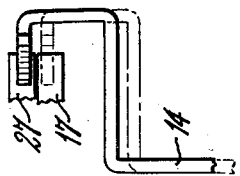
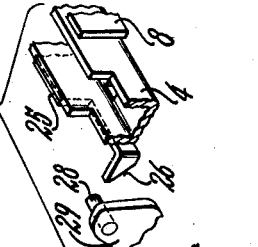
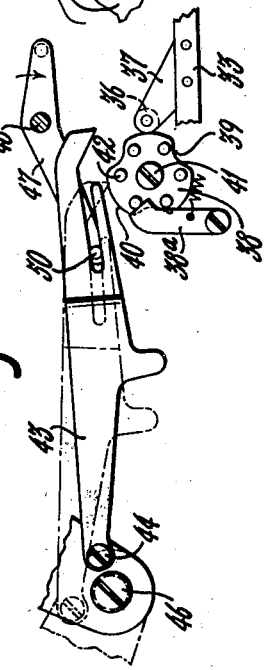
Inventor
WALTER A. ANDERSON
By K. G. Julihn
Attorney Patented Aug. 14, 1945

2,382,195

UNITED STATES PATENT OFFICE 2,382,195

CARRIAGE CONTROL FOR ACCOUNTING MACHINES

Walter A. Anderson, Bridgeport, Conn., assignor to Underwood Corporation, a corporation of Delaware Application May 4, 1944, Serial No. 534,112

3 Claims. (Cl. 235—60)

This invention relates to accounting machines having a travelling carriage and more particularly to mechanism for conditioning the machine function control mechanisms on the carriage.

Certain types of problems performed on modern accounting machines require but one complete or partial working stroke of the carriage to accomplish their solution. Other and more complex problems may require several (usually automatically initiated) successive complete or partial working strokes in effecting a sufficient number of machine operations to accomplish their solution. It is customary to modify or alter the machine functions in accordance with the type of function required in the solutions of the problems during the travel of the carriage from column to column. This control is customarily effected by carriage supported control magazines carrying lugs that cooperate with corresponding selectable machine-function-controlling levers. The action or nonaction of the control lugs upon their corresponding levers is governed or altered by a control cam movable into and out of the paths of cooperative extensions on lug actuating slides carried by the magazines.

Heretofore the shifting of the control cam has generally been performed manually and has required strict attention of the operator particularly where several shifts of the cam were necessary during a single stroke of the carriage or where a shift of the cam was necessary between multiple complete or partial, automatically initiated, successive strokes of the carriage.

It is an object of the present invention to provide a mechanism for conditioning the carriage control mechanism that is operable completely under the control of the travelling carriage and that is flexibly adjustable to control the conditioning of the carriage controls according to the particular requirements of the different problems involved in varying work programs and irrespective of whether the latter involve a single working stroke of the carriage or complete or partial successive, automatically initiated, working strokes of the carriage.

Another object of the invention will be in part obvious and in part particularly pointed out as the detailed description of the invention proceeds.

The invention consists in certain novel features of construction, and combinations of parts, the essentials of which are set forth in the appended claims, and a preferred embodiment of which is hereinafter described with reference to the drawings which accompany and form part of the specification.

In the drawings:

Figure 1 is a right side elevation of the improved carriage controlled mechanism for conditioning the carriage controls, the parts being shown operated to a position where they are just about to effect a change in the elevation of the control cam, Figure 2 is a perspective view of the mechanism with the parts shown in normal or rest position, the change in elevation of the control cam having been effected, Figure 3 is a detail side elevation of certain of the parts shown in Figures 1 and 2, in normal position, Figure 4 is a detail right side elevation of the front portion of the shiftable control cam showing its adjustability into and out of the path of the extensions occupying different elevations on the control lug operating slides, and Figure 5 is a fragmental perspective view of the forward end of one of the control magazines.

The invention as illustrated is applied to a machine such as disclosed in U. S. Patents Nos. 2,194,270 and 2,285,640, issued to Oscar J. Sundstrand on March 19, 1940 and to Walter A. Anderson on June 9, 1940, respectively, and is an improvement over the structures shown in these patents.

Referring to Figure 1, the accounting machine generally indicated at 1 has a travelling carriage 2 carrying a control plate 3 having secured thereon control magazines such as 4. Each magazine may carry control lugs 5 having pins 6 extending in cam slots 7 in a slide 8 mounted at 11 and 12 on magazine 4 for sliding movement forwardly and rearwardly of the machine. A spring 13, connected to the magazine and the slide, tends to pull the slide to its normal rear position. An extension 17 on the rear end of slide 8 lies in the plane of a cam 14 when the cam is in its lower position as shown in Figure 1.

If desired, a second slide 25 (Figure 5), similar to slide 8 except that it is provided with a cam surface 26 on its forward end, may be similarly mounted on the opposite side of magazine 4. This slide may likewise control movement of certain of the control lugs 5 other than those controlled by slide 8, and may have an extension 27 (Figure 4) similar to but at a higher elevation than extension 17, the extension 27 being also engageable by cam 14 when the cam is raised to the position shown in Figures 2 and 4. Cam surface 26 lies in the horizontal plane of a stud 28 on an escapement stop 29 suitably pivoted on the machine frame. As the carriage tabulates from column to column under control of the escapement stop 29 engaging the forward ends of the magazines, the lugs 5 cooperate with their corresponding machine-function-controlling levers such as 32 to condition appurtenant trains of mechanism of the machine to function in accordance with a predetermined work program.

Machine functions may be varied during a working stroke or strokes of the carriage by movement of slides 8 or 25 forwardly to retract and protract certain of the lugs 5. Further, it may be desired in certain working strokes of the carriage to skip certain columnar positions, and in such instances if a slide such as 25, having a cam 26, is mounted on the magazine upon that slide being moved forward, stud 28 and its associated escapement stop 29 will be lowered by the cam surface 26 to permit the carriage to pass through that columnar position.

Cam 14 is mounted on studs 15 and 16 for vertical movement on the machine frame. A forwardly extending projection 18 on the cam is held in engagement with a rod 21 by a spring 24 connected between the rod and the cam. Rod 21 is secured in a bail 22 pivoted at 23 in the machine frame and tensioned counterclockwise by a spring 20. Through these connections cam 14 is arranged to be raised or lowered into or out of the path of movement of extensions 17 and 27 to select which of the slides 8 or 25 will receive forward movement and thereby permit alteration of the control of machine functions in the different columnar positions of the carriage.

The mechanism above described and its mode of operation is identical with that disclosed in the before-mentioned patents.

As before stated, in performing certain types of operations on these machines, it is frequently necessary to modify or alter the machine function controls either during a single working stroke of the carriage or between multiple successive complete or partial working strokes of the carriage. Since these machines are equipped with conventional mechanism to automatically initiate repeated successive working strokes, it is highly desirable that the shifting of cam 14 into and out of the path of movement of extensions 17 and 27 to alter the controls be automatically effected during carriage movement without intervention of the operator.

This mechanism includes a link 33 pivoted at 34 to bail 22 and extending forwardly of the machine. A spring 35, superior in strength to spring 20, normally tensions the link forwardly and causes a roller 36 mounted on a projection 37 secured on the link to bear against the periphery of a cam 38 mounted for rotative movement upon a stud 41 secured in the machine frame. A series of equispaced pins 42 secured on one side of cam 38 are engageable by a pawl 43 pivoted at 44 to a rock arm 45 secured on the main rock shaft 46 of the machine. Shaft 46 and arm 45 oscillate through an angle of approximately 90° during each cycle of the machine. The right end of pawl 43 is normally held in ineffective position above studs 42 as shown in Figures 2 and 3, by a lever 47 pivoted at 48 in the machine frame and having a pin and slot connection 50 at one end with pawl 43 and a spring yielding connection 51 at its opposite end with an arm 52. Arm 52 is secured on a bail 53 pivoted on a rod 54 in the machine frame. A spring 55, connected between the bail 53 and the machine frame, tensions a depending arm 56 of the bail against one arm of a bell crank lever 57 pivoted at 58 in the machine frame. The opposite arm of the bell crank lever 57 extends rearwardly beneath an upright rod 59 suitably guided for vertical movement. The upper end of rod 59 lies immediately beneath selector lever 32.

When the parts are in the positions just described and as shown in Figures 2 and 3 with the forward end of pawl 43 being held above cam 38, the pawl reciprocates idly to and fro during each cycle of the machine.

Before commencing a given work program wherein it is desired to effect a change in the condition of the carriage controls in a predetermined columnar position, it is only necessary to insert a lug 60 (Figure 1) in the immediately preceding magazine 4 in the location on the magazine that corresponds to selector lever 32. Upon the carriage advancing to this columnar position lever 32 is depressed in the usual manner rocking bell crank 57 and bail 53 clockwise against the tension of spring 56 and rotating lever 47 counterclockwise a distance sufficient to lower the forward end of pawl 43 into the horizontal plane of the uppermost pin 42 of cam 38. Upon a cycle of the machine in this columnar position, as rock shaft 46 and arm 45 rock counterclockwise during the first half of the cycle, the forward end of the pawl ratchets over the pin (the yielding connection 51 permitting this movement), and during the second half of the cycle as shaft 46 and arm 45 rock clockwise, the pawl engages the pin and rotates cam 38 one step of movement. A spring-held detent 38a engaging pins 42 holds the cam in its moved position. Cam 38 is provided with alternate lobes 39 and depressions 40 and the step of movement imparted by pawl 43 is just sufficient to move the cam from a lobe 39 to a depression 40 or vice versa. Since link 33 and roller 36 follow the cam under tension of spring 35, the link is moved either to the right or to the left, and, through connections 18, 21, 22, and 34, raises or lowers cam 14 into or out of the path of extensions 17 and 27 so that upon tabulation of the carriage to the next columnar position the cam 14 is in proper position to condition the carriage controls in accordance with the particular operation to be performed. An indicating lever 61 is pivoted at 62 to the machine frame and connected by a pin and slot connection 63 to the forward end of link 33. The upper end of the lever extends through the machine housing and is shiftable to and fro with the link to signal the operator of the position of cam 14.

In performing operations wherein a change of control is necessary one or more times during a single working stroke of the carriage, a plurality of lugs such as 60 are placed in appropriate magazines just preceding the magazines occupying the columnar positions wherein it is desired to have the change of control effected. In performing operations wherein it is desired to have the change of control effected between multiple complete or partial working strokes, a lug 60 is placed, in the case of complete working strokes, in the last magazine of the series on the control plate, and in the case of partial working strokes, in the magazine just preceding that position of the carriage wherein an automatic carriage return would be effected after a partial working stroke had been completed.

It is seen from the foregoing that I have provided a mechanism for predeterminately conditioning the carriage controls and that is operable completely under the control of the travelling carriage and extremely flexible in meeting the demands of varying work programs requiring alteration of the carriage controls either one or more times during a single working stroke or requiring change of control between multiple partial or complete working strokes of the carriage. It has been found that with the use of this mechanism chance of error in machine operation is materially reduced by relieving the operator of the necessity of vigilantly watching the operations and accordingly manipulating the cam 14 at precisely the appropriate moment during carriage travel.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, a travelling carriage arranged for tabulation to a plurality of columnar positions, means, including an adjustable member, locatable in different positions for alterably controlling the machine in its operation in the different columnar positions, normally ineffective machine-actuated means for differentially locating the member, and means under the control of the carriage for selectively rendering the machine-actuated means effective in one or more columnar positions during travel of the carriage from one columnar position to another.

2. In a machine of the class described, a travelling carriage arranged for tabulation to a plurality of columnar positions, function controlling elements thereon, an adjustable member locatable in different positions and adapted to cooperate with said elements as the carriage is tabulated to said columnar positions, normally disabled machine-actuated means for differentially locating the member with respect to the elements to alter the control thereby, and carriage-controlled means for enabling the machine-actuated means for operation in predetermined columnar positions and in accordance with the requirements of a particular work program.

3. In a machine of the class described, a carriage movable to a plurality of columnar positions, means, including parts on the carriage, to alter the character of the machine operations in the different columnar positions, adjustable means carried by a stationary part of the machine and adapted to cooperate with the altering means, machine-actuated means for differentially locating the adjustable means with respect to the altering means, and means operated by the carriage for controlling the operation of the adjustable means by the machine-actuated means during travel of the carriage from one columnar position to another.

WALTER A. ANDERSON.